Fig. 1.

INVENTOR.
RALPH J. ROBINSON,
BY
ATTORNEY.

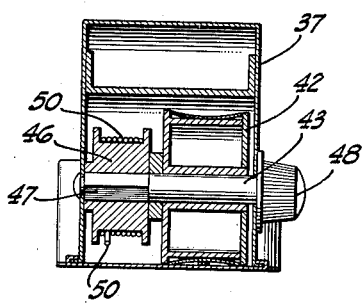
Fig. 5.
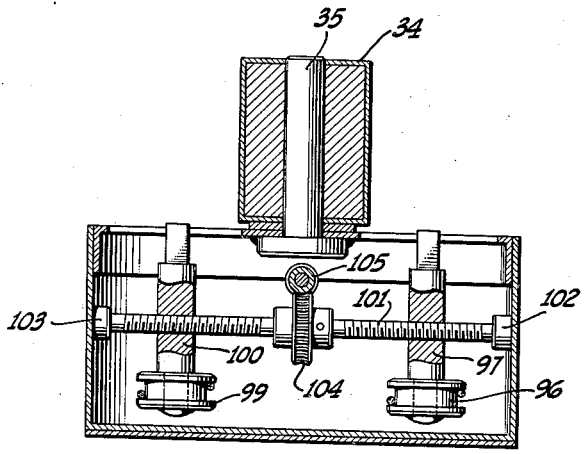
Fig. 6.
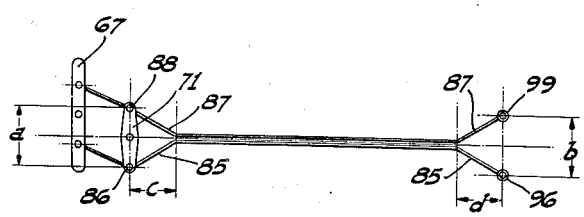
Fig. 7.
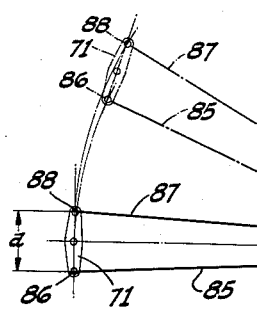
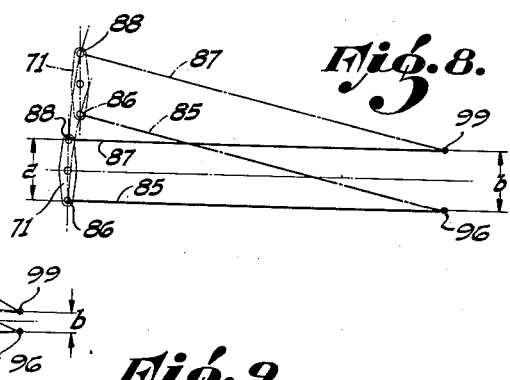
Fig. 8.
Fig. 9.
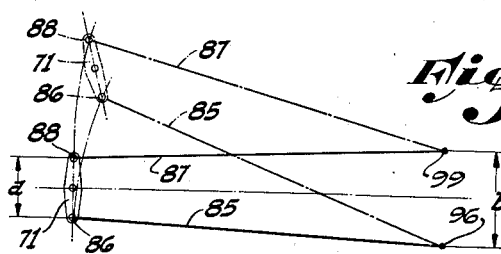
Fig. 10.
INVENTOR.
RALPH J. ROBINSON,
BY
ATTORNEY.

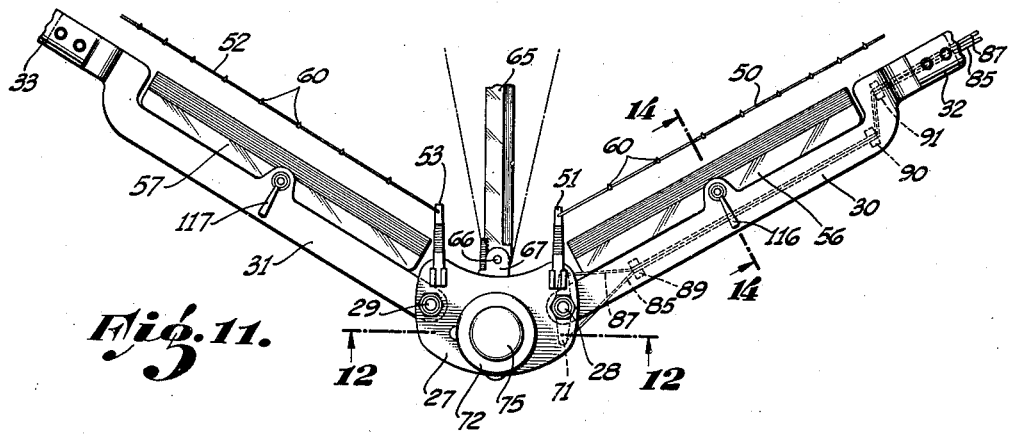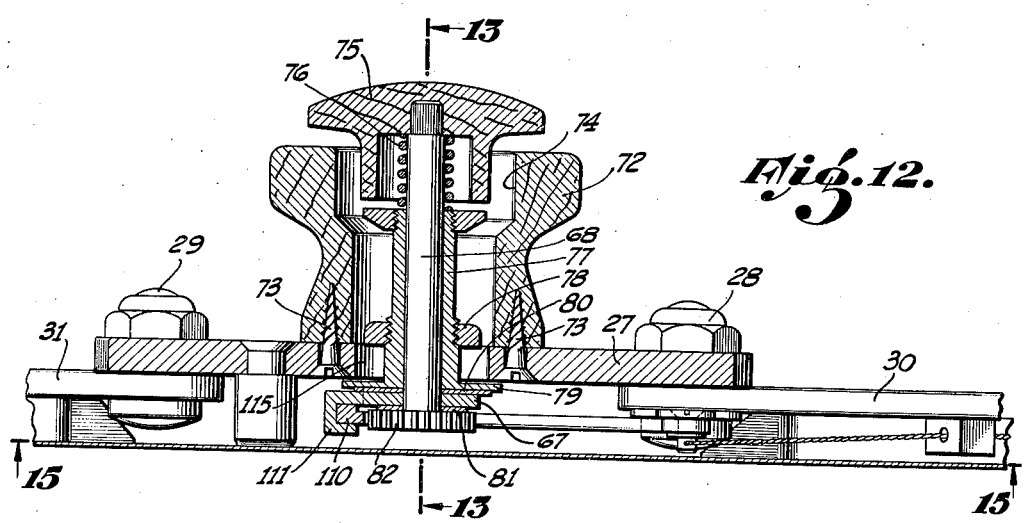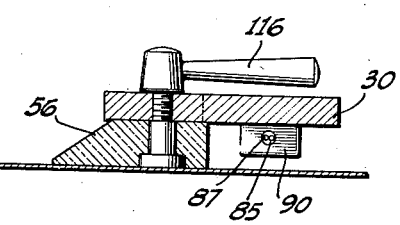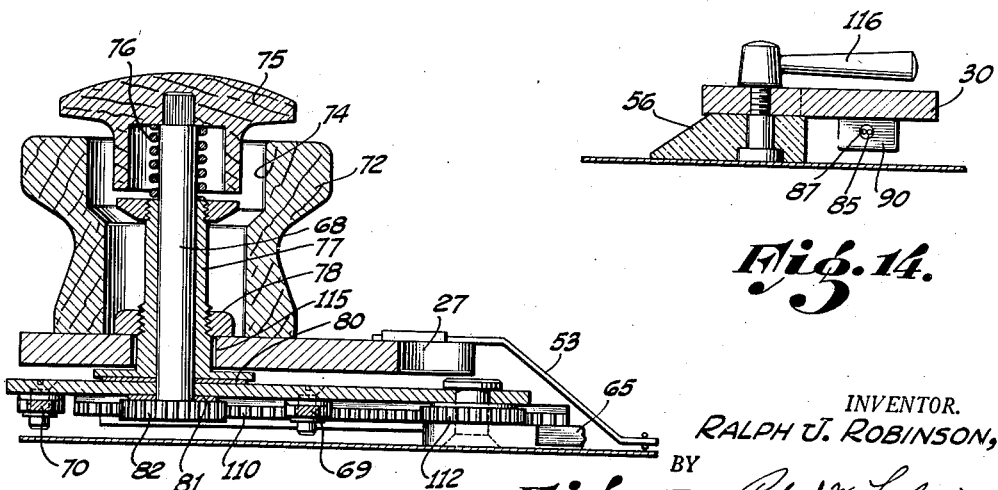

INVENTOR.
RALPH J. ROBINSON,
BY
Robert W. Fulwider
ATTORNEY.

Patented July 10, 1945

2,380,073

UNITED STATES PATENT OFFICE 2,380,073

APPARATUS FOR DRAWING PERSPECTIVES

Ralph J. Robinson, Los Angeles, Calif.

Application November 24, 1943, Serial No. 511,566

13 Claims. (Cl. 33—77)

This application is a continuation-in-part of my copending application, Serial No. 459,610, filed September 25, 1942, and relates generally to the art of making perspective drawings.

More particularly, my invention relates to apparatus provided with movable straight-edges which are pivoted about the vanishing points so that for all positions of the machine, the straight-edges pass through the vanishing points.

The major object of my invention is to provide a perspective machine with which accurate perspectives can be rapidly produced without a great deal of previous training, and which therefore makes possible the production of satisfactory drawings by persons relatively unskilled in the art.

Another object of my invention is to provide perspective apparatus which is substantially foolproof in its operation, and which can be readily adapted for various kinds of perspective work.

It is also an object of my invention to provide apparatus of the character described which is very sturdy in construction and because of its compact design can be used on drafting boards of various sizes to make a wide range of drawings.

Another object of my invention is the provision of a proportional scale in combination with the straight-edge assembly previously mentioned, thus making possible the ready use of improved drafting methods not possible with heretofore known apparatus.

Still another object of my invention is to provide perspective drawing apparatus embodying vertical straight-edge mechanism which insures the proper position of the vertical straight-edge at all times, but which by suitable adjustment can be adapted to allow the straight-edge to assume other angular positions for particular purposes.

One of the principal features of my invention is the provision of retractable straight-edges passing through the vanishing points at all times irrespective of their position.

Figure 2:
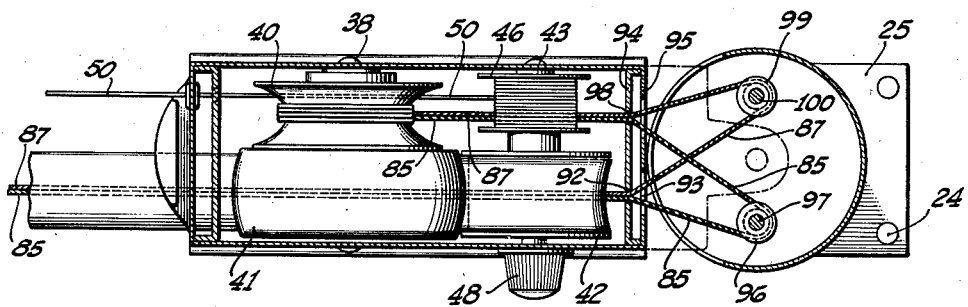
Figure 3:
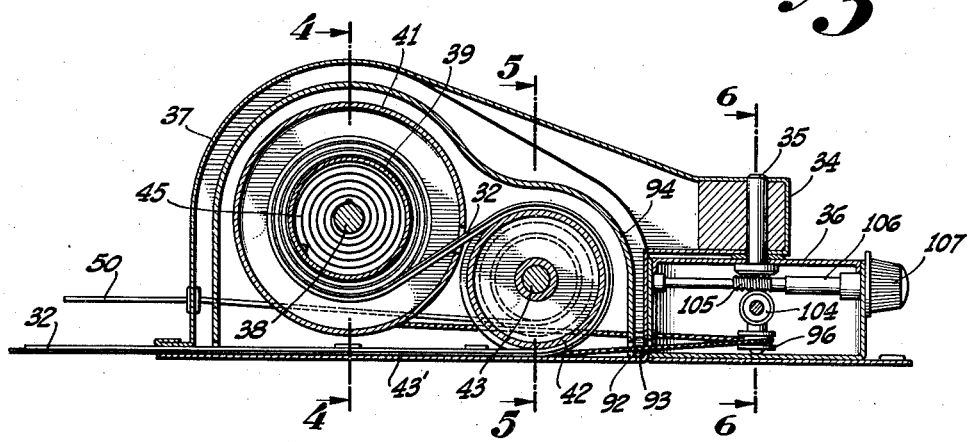
Figure 4:
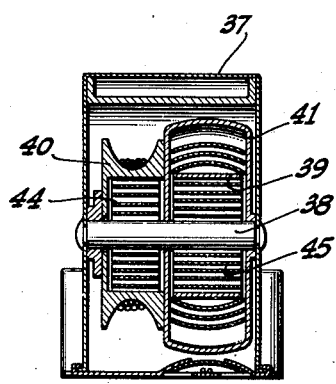
Figure 15:
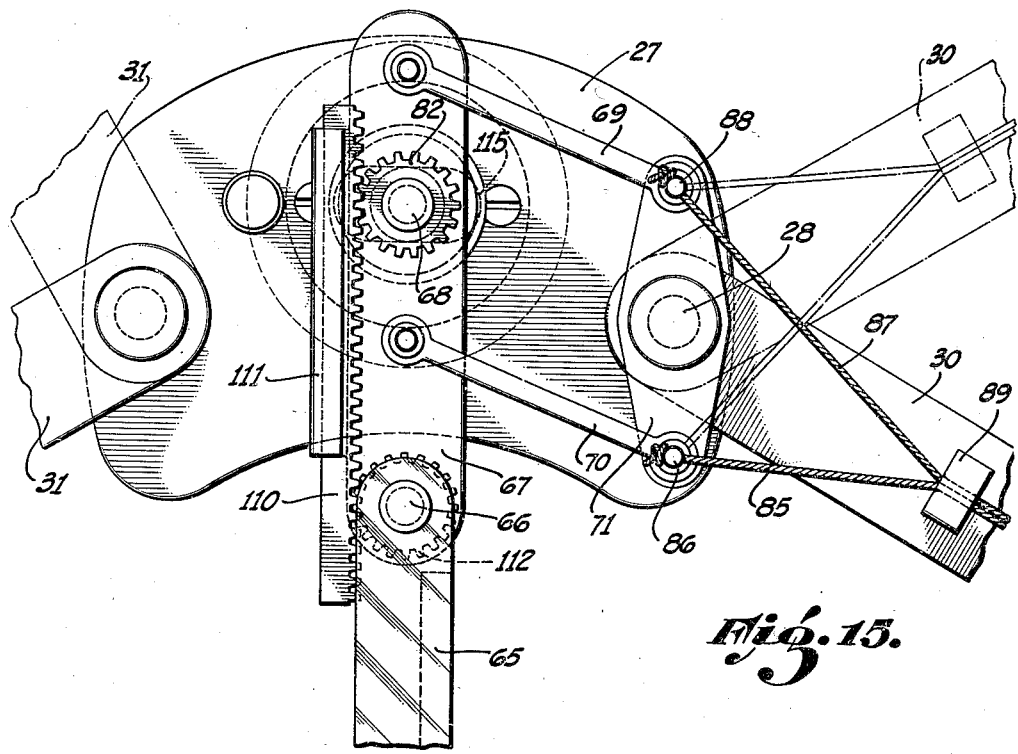
Figure 16:
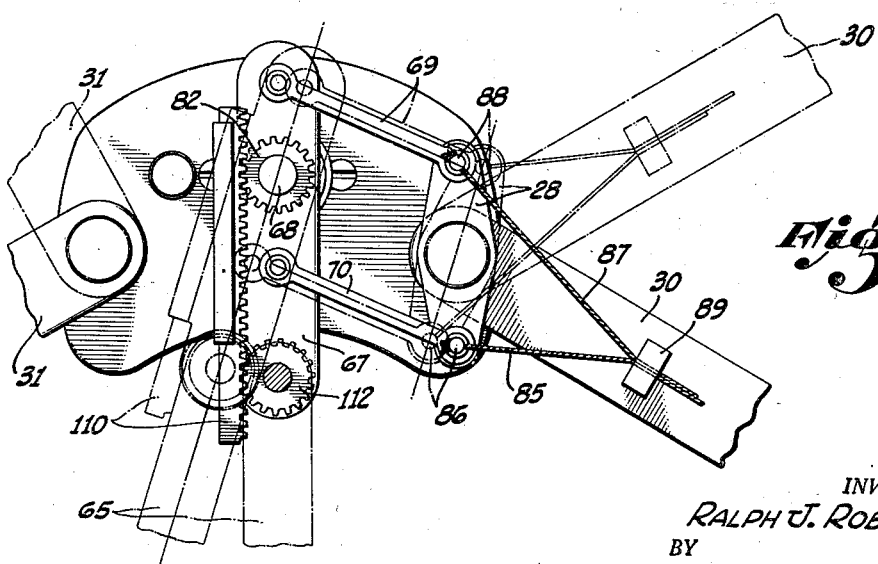

These and other objects and advantages of my invention will become apparent from the following description of a preferred form thereof, and from the accompanying drawings, in which:

Fig. 1 is a perspective view of the apparatus of my invention disposed on a drawing board, and being used for the production of a perspective drawing, the full lines showing the machine in one position, and the broken lines showing it in another position, Fig. 2 is a top plan view partially in section of the right-hand vanishing point head which includes means for controlling the vertical straight-edge, Fig. 3 is a front elevation partially in section of the head shown in Fig. 2, Fig. 4 is a vertical section taken on the line 4—4 in Fig. 3, Fig. 5 is a vertical section taken on the line 5—5 in Fig. 3, Fig. 6 is a vertical section taken on the line 6—6 in Fig. 3, Figs. 7, 8, 9 and 10 are schematic views showing the operation of the vertical straight-edge control means, Fig. 11 is a plan view of the movable center plate, the vertical straight-edge and the two vanishing point straight-edges, Fig. 12 is an enlarged vertical section of the center plate and adjusting knob mechanism taken on the line 12—12 of Fig. 11, Fig. 13 is an enlarged vertical section taken on the line 13—13 of Fig. 12, Fig. 14 is an enlarged vertical section taken on the line 14—14 of Fig. 11, Fig. 15 is a bottom plan view of the center plate and vertical straight-edge adjusting mechanism taken as indicated by the line 15—15 in Fig. 12, and Fig. 16 is a view similar to Fig. 15 illustrating the modification in movement of the vertical straight-edge when its control cables are adjusted to a different position.

Referring now to the drawings, and particularly to Fig. 1 thereof, the numeral 20 indicates generally the right-hand vanishing point head, which for brevity will hereinafter be referred to as the "right" head, and which includes the control mechanism for the vertical straight-edge. The numeral 21 indicates generally the left-hand vanishing point head, which will be referred to as the "left" head, while the numeral 22 indicates generally the center plate assembly, all to be more fully described in detail hereinafter. In Fig. 1, the apparatus is shown as disposed upon a drafting board 23, the right head 20 being secured thereto by thumb tacks 24 passing through suitable holes in a horizontal base plate 25, and the left head 21 being pivotally mounted to the drawing board by means of a single thumb tack 26 fastening through a suitable hole in a base plate forming the bottom of the head 21. The center plate assembly 22 includes a center plate 27 pivotally connected by means of pins 28 and 29 respectively, to straight-edge supporting arms 30 and 31 which lie flat upon the drafting board and connect to flexible tapes 32 and 33 respectively. The tapes are preferably made of metal or other suitable flexible material which can be rolled on a reel.

The right head 20 includes a forward casing 37 having an extended rear portion 34 adapted to pivotally engage a vertical pin 35 rigidly mounted in a rear housing 36 secured to the base plate 25. The rear housing 36 is thus held in fixed position on the board by means of the thumb tacks 24 and the forward housing 37 can be pivoted about the pin 35 during drafting operations.

Referring now to Figs. 2 to 4, inclusive, it is seen that the forward housing 37 has a horizontal shaft 38 mounted laterally therein which carries a pair of spring rollers 39 and 40 connected thereto by spiral springs 45 and 44, respectively. The roller 39 rotates in a housing 41 and carries a roll of flexible tape thereon, the free end 32 of which passes out through fixed housing 41 and around an idler roller 42 which is rotatable on a horizontal shaft 43 mounted in the rear part of housing 37. After the tape 32 passes around the roller 42 it travels along the base 43' of the housing 37 and out through an aperture in the forward wall thereof to connect with the straight-edge supporting arm 30 as hereinbefore described.

As seen best in Figs. 2, 3 and 5, the idler roller shaft 43 has a drum 46 secured thereto, this being accomplished by any suitable means such as the square shaft portion 47. The shaft 43 is provided with a knob 48 on one end thereof and is frictionally mounted in the housing 36 for rotation when sufficient torque is exerted on the knob 48, although normally the shaft remains stationary with the roller 42 rotating freely thereon. The drum 46 carries a rubber or other resilient band 50 wound thereon which extends under the roller 40 and through an aperture in the forward wall of housing 37 to connect with a suitable bracket 51 on plate 27 for a purpose to be hereinafter discussed.

The left head 21 is preferably similar to right head 20 and includes a forward housing 37 having a shaft 38 with a spring roller 39 thereon carrying the flexible tape 33 which is adapted to be unwound and passed around an idler roller 42. The head 21 also carries a drum 46 which has a rubber or other resilient band 52 wound thereon and extending outwardly therefrom through the casing to an attachment bracket 53 carried by center plate 27. Since these parts may be identical with corresponding parts in head 20, no details of the interior of head 21 have been illustrated, it being thought sufficient to indicate its housing by the numeral 54, and the knob carried by the end of the idler roller shaft by the numeral 55.

The operation of these major parts of my apparatus in the production of perspective lines passing through predetermined vanishing points are as follows. Desirable vanishing points are first chosen for the particular drawing to be made and the right and left-hand heads are secured to the drafting board so that they will pivot about the chosen vanishing points. The retractable tapes 32 and 33 with their respective straight-edge supporting arms 30 and 31 secured to center plate 27 rest flat on the drawing board, and by suitable manipulation may be moved to any position thereon, such for example as the two positions shown in Fig. 1. In all of these positions, the upper edges of tapes 32 and 33 and their straight-edges 56 and 57 always pass through the vanishing points. In the illustration shown in Fig. 1, the straight-edge 56 has produced all of the lines which pass through the vanishing point established by right head 20, and straight edge 57 has drawn all of the lines which pass through the vanishing point established by the left head 21. While these portions of my apparatus are extremely useful in perspective drawing, I also provide means for drawing the necessary vertical and near-vertical lines needed in perspective operations, and in addition I provide the proportional scales 50 and 52 previously mentioned.

As previously mentioned, I form the proportional scale bands 50 and 52 of rubber or other suitable elastic material which stretches uniformly over its length. To these elastic bands I affix a plurality of markers 60 which are spaced along the bands from the center plate at progressively decreasing intervals to form a perspective measurement scale. The correct intervals of spacing for the markers can be determined by known methods of perspective measurement or from charts, etc., available in the art. Since the bands stretch uniformly over their entire length, the ratios of the intervals between markers will remain the same for all positions of the center plate. The tension on the bands can be adjusted by rotation of the knobs 48 and drums 46 so that the initial spacing of the markers can be set at any desired amount.

Referring now to the center plate assembly 22, and particularly to Figs. 1, 11 and 15 illustrating the assembly in plan view, the numeral 65 indicates a movable straight-edge carried by the center plate 27 which, because it is normally held in a vertical or near-vertical position, I will refer to herein as the vertical straight-edge. This straight-edge 65 is pivotally mounted by a pin 66 to a normally vertical center bar 67 which in turn is rotatably mounted on a shaft 68 passing through the center plate 27. The center bar 67 is pivotally connected by a pair of parallel links 69 and 70 to a rocker arm 71 pivotally mounted on plate 27 by means of pin 28 which connects the plate 27 with straight-edge supporting arm 30. The rocker arm 71 and the center bar 67 are arranged parallel to each other, and with parallel links 69 and 70 form a parallelogram as seen best in Fig. 15. The center plate 27 is provided with a knob 72 secured thereto by convenient means such as screws 73, and the shaft 68 upon which the center bar 67 is mounted extends upwardly through a bore 74 in the knob 72 and is provided with a head 75 fast to its upper end. The head 75 and shaft 67 are urged upwardly by a coil spring 76 which surrounds the shaft 67 and bears between the underside of the head 75 and the upward face of a vertical bearing post 77 which rests on center plate 27 by virtue of a nut 78 screwed on its mid-section. It will be noted that the post 77 is bored to permit the passage of shaft 68, and is provided with a head on its lower end 79 which is normally spaced just below the underface of center plate 27 so that the post and shaft assembly float on the spring 76. A friction washer 80 is inserted between head 79 and the top of the center bar 67 to provide frictional contact therebetween, and a second friction washer 81 is inserted between the bottom of the center bar 67 and a gear 82 which is fast to the lower end of shaft 68. Consequently gear 82, center bar 67 and head 79 are normally held together as a unit by the combined action of the spring 76 and the washers 80 and 81, and are freely movable with respect to center plate 27 and its handle knob 72.

Returning now to Figs. 11 and 15, it will be seen that a cable 85 is attached to the pivot pin 86 joining link 70 and rocker arm 71, and a similar cable 87 connects to pivot pin 88 which joins link 69 with rocker arm 71. The cables 85 and 87 are led along the arm 30 through guides 89, 90, and 91 on the underside thereof, thence along the underside of tape 32 into the housing 37 and underneath the idler roller 42.

The cables then pass through a guide aperture 92 in a partition 94 in the rear portion of the housing 37, and thence out through an enlarged aperture 93 in the rear wall 95 of said housing. From aperture 93 the cable 85 passes around a pulley 96 mounted for rotation on a vertical shaft 97, and thence to a guide aperture 98, then underneath the drum 46, and finally around the spring roller reel 40 to which it is attached. Similarly cable 86 passes from guide aperture 92 around a pulley 99 rotatably mounted on a vertical shaft 100 and thence through the guide aperture 98, under drum 46, and around spring roller pulley 40 to which it is also attached. (See Fig. 2.)

As seen best in Fig. 6, the vertical shafts 97 and 100 hung from a horizontal screw shaft 101 rotatably mounted in bearings 102 and 103 in the side walls of housing 36, shafts 97 and 100 being threaded so that rotation of the screw 101 causes the vertical shafts to move inwardly or outwardly together, the threads on the two ends of the screw shaft 101 being reversed so that the vertical shafts 97 and 100 will each move inwardly or will each move outwardly as the case may be. The screw shaft 101 is provided with a pinion gear 104 which is rotatably mounted in housing 36 and provided with a knob 107 for manual adjustment.

It will thus be seen that as the center plate is moved toward and away from the right head 20 both the tape 32 and cables 85 and 87 will be wound and unwound on their respective spring rollers to maintain the proper tension thereon, it being understood that the cables should always be the same length. The vertical shafts 97 and 100 are normally spaced the same distance apart as the pivot pins 86 and 88 on rocker 71, thus maintaining the parallelogram, and causing the rocker 71 and its associated center bar 67 and vertical straight-edge 65 to remain vertical at all times irrespective of the position of the center plate. This is best illustrated in Fig. 15 in which the solid lines show the relation of the parts for one position of the machine while the broken lines indicate a different relative position for the arms and cables with respect to the center plate when the plate has been moved. However, it will be noted that the linkage comprising the rocker 71, links 69 and 70 and center bar 67 has not changed its position with respect to the center plate 27. Consequently, once the cables are properly adjusted with the vertical straight-edge in a vertical position, the straight edge will maintain this position at all times so long as the pulleys 96 and 99 and their respective shafts 97 and 100 are maintained at exactly the same distance apart as the pivot points 86 and 88. This relationship is further shown in Figs. 7 and 8 which illustrate diagrammatically why the foregoing result is accomplished. In other words, so long as distance $a$ always equals distance $b$, and the distance $c$ always equals the distance $d$, the center bar 67 and the rocker 71 will remain vertical at all times.

However, if it is desired to have the vertical straight-edge 65 rotate one way or the other with variations in position of the center plate, it is only necessary to rotate the knob 107 and shafts 106 and 101 to vary the positions of the pulleys 96 and 99. Fig. 9 illustrates what happens to the rocker arm 71 and consequently to the center bar 67 and straight-edge 65 when the pulleys 96 and 99 are moved in toward each other. In this case, the vertical straight-edge is rotated in a clockwise direction as the center plate moves along the base line. In Fig. 10, the opposite is true where the pulleys 96 and 99 have been moved outwardly beyond their normal position, so that the rocker 71 and the vertical straight-edge rotate in a counter-clockwise direction. This is sometimes advisable when drawing certain types of perspectives where it is desired to have the lines that simulate the vertical lines in the object being drawn, assume an angle, such for example, as in the case of a perspective looking up toward a long object such as a building. This situation is illustrated in Fig. 16 where the broken lines illustrate the position of the linkage and the respective parts when the pulleys 96 and 99 have been moved outwardly.

Under certain conditions it will be desirable to have the vertical straight-edge 65 normally assume an angle away from the vertical and to maintain that angle irrespective of the position of the center plate 27. For this purpose I have provided the rack and gear mechanism shown best in Figs. 12, 14, 15 and 16 now to be described. As previously mentioned, the shaft 68 carries a gear 82 on its lower end which meshes with a movable rack 110, slidable in a guide 11 provided by the head 67 of the center post 77. The rack 110 engages with a gear 112 fast to the straight-edge 65 and rotatable therewith about the pin 66 carried by the center bar 67. Consequently, when the knob 75 is rotated manually, which can be done by pressing down on it to relieve the pressure exerted by spring 76, the shaft 68 and its gear 82 are rotated, which causes the rack 110 to move longitudinally and rotate the gear 112, which in turn rotates the vertical straight-edge 65 to such new position as is desired. Once the straight-edge 65 has been rotated to the desired position, the knob 75 is released and the spring 76 restores adequate friction contact between the various parts so as to retain this straight-edge in this new relative position with respect to the center bar 67. Consequently as the center plate 67 is moved about from position to position, the straight-edge 65 will continue to occupy the same new angular position if the apparatus is set up for normal functioning so that the center bar stays vertical at all times.

It will be noted that the center plate 27 is provided with a lateral slot 115 to permit universal movement of center plate 27 about the post 77 and its associated parts. This is helpful when it is desired to vernier the angular straight-edges 56 and 57 into position. With the slot 115 the operator can, by grasping the knob 72 move the center plate with respect to the post and shaft assembly in the slot 115 to thereby vary the position of the straight edges 56 and 57 without disturbing the center bar and linkage.

As seen best in Figs. 11 and 14, the angular straight-edges 56 and 57 are supported on the arms 30 and 31 by means of thumb screw clamps 116 and 117 so that they can be removed or adjusted as desired, although normally they are aligned with their respective tapes.

From the foregoing description of a preferred form of my device, it will be seen that I have provided a perspective drawing instrument which makes possible practically complete mechanical production of perspectives, so that one relatively unskilled in the art, can, after a few simple lessons with my machine, draw the most difficult perspectives in a very short time. The truth of this fact has been borne out by extended use of the machines by novices in the art of drafting, and exceptionally fine results have been obtained. It is to be understood of course that while I have illustrated and described one form of my invention with considerable particularity, I do not mean to limit myself to the various details shown, but rather intend that my invention should be given the full scope of the appended claims.

I claim:

1. In apparatus for the production of perspective drawings by the use of vanishing points, the combination of: a pair of heads adapted to be mounted on a drawing board to establish said vanishing points; retractable means housed in each of said heads; and a center plate pivotally connected to the free ends of said retractable means, whereby movement of said plate over said board will cause movement of each of said retractable means.

2. In apparatus for the production of perspective drawings by the use of vanishing points, the combination of: a pair of heads adapted to be mounted on a drawing board to establish said vanishing points; a flexible tape housed in each of said heads; and means pivotally connecting the free ends of said tapes, whereby movement of said connecting means over said board will cause movement of each of said tapes.

3. In apparatus for the production of perspective drawings by the use of vanishing points, the combination of: a pair of heads adapted to be mounted on a drawing board to establish said vanishing points; a flexible tape mounted on a spring roller housed in each of said heads; and a center plate pivotally connected to the free ends of said tapes, whereby movement of said plate over said board will cause movement of said tapes.

4. In apparatus for the production of perspective drawings by the use of vanishing points, the combination of: a pair of heads adapted to be mounted on a drawing board to establish said vanishing points; retractable means housed in each of said heads; and a center plate carrying a normally vertical straight edge pivotally connected to the free ends of said retractable means, whereby movement of said plate over said board will cause movement of each of said retractable means.

5. In apparatus for the production of perspective drawings by the use of vanishing points, the combination of: a pair of heads adapted to be mounted on a drawing board to establish said vanishing points; a flexible tape mounted on a spring roller in each of said heads; and means pivotally connecting the free ends of said tapes, whereby movement of one of said tapes over said board will cause complemental movement of the other of said tapes.

6. In apparatus for the production of perspective drawings by the use of vanishing points, the combination of: a pair of heads adapted to be mounted on a drawing board to establish said vanishing points; a flexible tape mounted on a spring roller in each of said heads; a center plate carrying a normally vertical straight edge pivotally connected to the free ends of said tapes; and means operatively associated with one of said heads and said plate for maintaining said straight edge in a predetermined position at all times, irrespective of its position on said board.

7. In apparatus for the production of perspective drawings by the use of vanishing points, the combination of: a pair of heads adapted to be mounted on a drawing board to establish said vanishing points; a spring roller rotatably mounted in each of said heads; a flexible tape wound on each of said rollers with its free end extending out of said housing; a center plate pivotally connecting the free ends of said tapes to effect universal and simultaneous movement thereof over said board; a straight edge carried by said center plate and adapted to normally be in a substantially vertical position; means operatively associated with one of said heads for controlling the position of said straight edge, comprising a spring roller, cable spacing means, and a pair of cables connected to a rocker on said center plate; and a pair of parallel links connecting said rocker to said straight edge whereby the latter will assume a predetermined position for every position of said center plate on said board.

8. In apparatus for the production of perspective drawings by the use of vanishing points, the combination of: a pair of heads adapted to be mounted on a drawing board to establish said vanishing points; a spring roller rotatably mounted in each of said heads; a flexible tape wound on each of said rollers with its free end extending out of said housing; a center plate pivotally connecting the free ends of said tapes to effect universal and simultaneous movement thereof over said board; a straight-edge carried by said center plate and adapted to normally be in a substantially vertical position; a rocker pivotally mounted on said center plate and connected to said straight-edge by a pair of parallel links; a pair of cables extending from said rocker to spring roller means within one of said heads; and guide means for guiding said cables from said rocker to said spring roller means.

9. In apparatus for the production of perspective drawings by the use of vanishing points, the combination of: a pair of heads adapted to be mounted on a drawing board to establish said vanishing points; a spring roller rotatably mounted in each of said heads; a flexible tape wound on each of said rollers with its free end extending out of said housing; a center plate pivotally connecting the free ends of said tapes to effect universal and simultaneous movement thereof over said board; a straight-edge carried by said center plate and adapted to normally be in a substantially vertical position; a rocker pivotally mounted on said center plate and connected to said straight-edge by a pair of parallel links; a pair of cables extending from said rocker to spring roller means within one of said heads; and a pair of guide rollers for said cables associated with said head and adjustable toward and away from each other to vary the spacing of said cables, whereby said straight-edge may be caused to rotate upon movement of said center plate.

10. In apparatus for the production of perspective drawings by the use of vanishing points, the combination of: a pair of heads adapted to be mounted on a drawing board to establish said vanishing points; a spring roller rotatably mounted in each of said heads; a flexible tape wound on each of said rollers with its free end extending out of said housing; a center plate pivotally connecting the free ends of said tapes to effect universal and simultaneous movement thereof over said board; a center bar pivotally mounted on said center plate; a shaft passing through said center bar carrying a gear on its lower end; a rack engaging said gear; a normally vertical straight-edge pivotally mounted to said center bar and having a gear integral therewith engaging said rack, whereby rotation of said shaft rotates said straight-edge through the medium of said rack and gears; and frictional means normally holding said parts against rotation.

11. In apparatus for the production of perspective drawings by the use of vanishing points, the combination of: a head adapted to be pivotally mounted on a drawing board; a retractable tape mounted within said head and adapted to be extended therefrom; means within said head for holding said tape in retracted position; a plate carrying a normally vertical straight edge pivotally connected to the free end of said tape; and means operatively associated with said head and said plate for maintaining said straight edge in a predetermined position at all times, irrespective of its position on said board.

12. In apparatus for the production of perspective drawings by the use of vanishing points, the combination of: a head adapted to be pivotally mounted on a drawing board; a retractable tape mounted within said head and adapted to be extended therefrom; a spring roller in said head upon which said tape is wound; a plate pivotally connected to the free end of said tape; a straight-edge carried by said plate and adapted to normally be in a substantially vertical position; a rocker pivotally mounted on said center plate and connected to said straight-edge by a pair of parallel links; a pair of cables extending from said rocker to spring roller means within said head; and guide means for guiding said cables from said rocker to said spring roller means.

13. In apparatus for the production of perspective drawings, the combination of: a head adapted to be mounted on a drawing board to establish a vanishing point; a spring roller rotatably mounted in said head; a flexible tape wound on said roller with its free end extending out of said housing; a center plate pivotally connected to the free end of said tape; a straight-edge carried by said center plate and adapted to normally be in a substantially vertical position; means operatively associated with said head for controlling the position of said straight-edge, comprising a spring roller, cable spacing means, and a pair of cables connected to a rocker on said center plate; and a pair of parallel links connecting said rocker to said straight edge whereby the latter will assume a predetermined position for every position of said center plate on said board.

RALPH J. ROBINSON.